US010598201B2

(12) United States Patent
Cordeiro et al.

(10) Patent No.: US 10,598,201 B2
(45) Date of Patent: Mar. 24, 2020

(54) METHOD OF MOUNTING INSERTS AND A DEVICE FOR MOUNTING INSERTS

(71) Applicant: EMBRAER S.A., São José dos Campos-SP (BR)

(72) Inventors: Elton Candia Cordeiro, São José dos Campos (BR); Fábio Rodrigues Costa, São José dos Campos (BR); Gustavo Franco Barbosa, São José dos Campos (BR)

(73) Assignee: EMBRAER S.A., São José dos Campos-SP (BR)

( * ) Notice: Subject to any disclaimer, the term of this patent is extended or adjusted under 35 U.S.C. 154(b) by 80 days.

(21) Appl. No.: 15/528,863

(22) PCT Filed: Nov. 24, 2015

(86) PCT No.: PCT/BR2015/000174
§ 371 (c)(1),
(2) Date: May 23, 2017

(87) PCT Pub. No.: WO2016/082012
PCT Pub. Date: Jun. 2, 2016

(65) Prior Publication Data
US 2017/0314598 A1 Nov. 2, 2017

(30) Foreign Application Priority Data
Nov. 27, 2014 (BR) ...................... 10 2014 029638 7

(51) Int. Cl.
*F16B 11/00* (2006.01)
*B65H 35/00* (2006.01)
*F16B 12/04* (2006.01)

(52) U.S. Cl.
CPC ........ *F16B 11/006* (2013.01); *B65H 35/0013* (2013.01); *F16B 12/04* (2013.01)

(58) Field of Classification Search
CPC ..... F16B 11/006; F16B 12/04; B65H 35/0013
See application file for complete search history.

(56) References Cited

U.S. PATENT DOCUMENTS 3,871,945 A * 3/1975 Winrow .................. G09F 9/375
156/252
4,948,442 A * 8/1990 Manns ................ B01L 3/50255
156/268

(Continued)

OTHER PUBLICATIONS

International Search Report for PCT/BR2015/000174 dated Feb. 23, 2016, 4 pages.

(Continued)

*Primary Examiner* — Mark A Osele
*Assistant Examiner* — Christopher C Caillouet
(74) *Attorney, Agent, or Firm* — Nixon & Vanderhye P.C.

(57) ABSTRACT

There is described a method of mounting inserts, comprising the following steps: •(i) Application of an adhesive film on one of the faces of an inserts tray (223) covering a plurality of through-holes (241) and respective depressions (242); •(ii) Insertion of an insert (230) in each through-hole (241) of the tray (223) from a face of the inserts tray (223) opposite that of the adhesive film, securing one surface of the insert (23) onto this adhesive film; •(iii) Cutout of the adhesive film forming a plurality of single films (245) associated with the inserts (230). There is further described an insert mounting device (300), comprising a holding table (314) held by a supporting base (311), the insert mounting device (300) further comprising a rotating tray holder (312), cooperating with a cutting system (313).

19 Claims, 6 Drawing Sheets

(56) References Cited

U.S. PATENT DOCUMENTS

| | | | | |
|---|---|---|---|---|
| 5,480,508 A | * | 1/1996 | Manabe | B26D 3/08 |
| | | | | 156/353 |
| 5,591,368 A | * | 1/1997 | Fleischhauer | A24F 47/008 |
| | | | | 131/194 |
| 6,136,137 A | * | 10/2000 | Farnworth | B28D 5/0094 |
| | | | | 156/701 |
| 2007/0057378 A1 | | 3/2007 | Arai et al. | |
| 2012/0183748 A1 | * | 7/2012 | Schindler | B29C 65/1412 |
| | | | | 428/195.1 |

OTHER PUBLICATIONS

Written Opinion of the ISA for PCT/BR2015/000174 dated Feb. 23, 2016, 4 pages.

* cited by examiner

METHOD OF MOUNTING INSERTS AND A DEVICE FOR MOUNTING INSERTS

CROSS-REFERENCE TO RELATED APPLICATIONS

This application is the U.S. national phase of International Application No. PCT/BR2015/000174 filed Nov. 24, 2015 which designated the U.S. and claims priority to BR Patent Application No. 10 2014 029638-7 filed Nov. 27, 2014, the entire contents of each of which are hereby incorporated by reference.

FIELD

The present invention refers to a method of mounting inserts and to a device for mounting inserts, particularly used in an automated process for manufacturing pieces of furniture and being capable of preparing a plurality of different inserts to be used in the process.

DESCRIPTION OF THE PRIOR ART

The manufacture of furniture, particularly aeronautical furniture, makes use of a raw material based on fiberglass with epoxy resin and polyaramide. The plates of fiberglass with epoxy resin form external surfaces that comprise, in the gap between the plates, the polyaramide, forming a porous sandwich-type assembly. That assembly can also be made entirely of aluminum depending on the stresses to which the piece will be subjected.

That manufacturing process of furniture pieces that uses the fiberglass or aluminum material is comprised of several steps that must be made with precision such that the produced pieces have final measures within their tolerance specifications, allowing precise engagement fittings at the time of construction and installation of the furniture.

Among the various steps of manufacture of the pieces of furniture there is included the step of installation of inserts. Inserts are components, generally of cylindrical shape, that are inserted in holes made in the manufacturing plates of the pieces of furniture and will have the purpose of receiving pins, screws and other elements of fastening and engagement fitting during the final assembly of the pieces.

In processes of fabrication of conventional pieces of furniture, then inserts are inserted manually in the holes of the plates, requiring a great deal of labor due to the large quantity of inserts that must be installed in the plates whereof the pieces are machined.

However, when the pieces of furniture are manufactured using an automated process that uses an integrated manufacture cell with various steps realized by a robotic arm, the inserts must be prepared and mounted on trays, in order to enable the placement of these inserts in the holes in an automated form, by the robotic arm.

In this regard, it is not known in the art a method or a device able to mount the inserts or prepare the same to be used in automated manufacturing processes.

OBJECTS OF THE INVENTION

Thus, the objective of the present invention is the provision of a method for mounting inserts that prepares the inserts rendering the same able to undergo an automated process step.

One other objective of this invention consists in the provision of an insert mounting device capable of preparing the inserts in appropriate trays to be used in automated fabrication processes of furniture pieces.

BRIEF DESCRIPTION OF THE INVENTION

The object of the present invention is a method for mounting inserts, comprising the following steps: (i) Application of an adhesive film on one of the faces of a tray of inserts covering a plurality of through-holes and respective depressions; (ii) Insertion of one insert in each through-hole of the tray, through the face opposite the face of the adhesive film, securing a piece of the insert to this adhesive film; (iii) Cutting out the adhesive film forming a plurality of single films associated to the inserts.

A further object of this invention is an insert mounting device that comprises a support table supported by a supporting base, a device for mounting the inserts and a tray holder cooperating with a laser cutting device.

BRIEF DESCRIPTION OF THE DRAWINGS

The present invention will be described below with more detail, based on an example of realization depicted in the drawings. The figures show.

DETAILED DESCRIPTION OF THE INVENTION

According to a preferred embodiment and as illustrated by FIGS. 1 to 7, the present invention refers to a method for mounting inserts and to an insert mounting device 300.

The insert mounting device 300 (FIGS. 3 and 4) prepares a plurality of inserts 230 and makes the same available on a plurality of insert trays 223 (FIG. 2), that are then placed over a guide rail 226 (FIG. 5) for use in an integrated manufacture cell (not shown).

Figure 3:
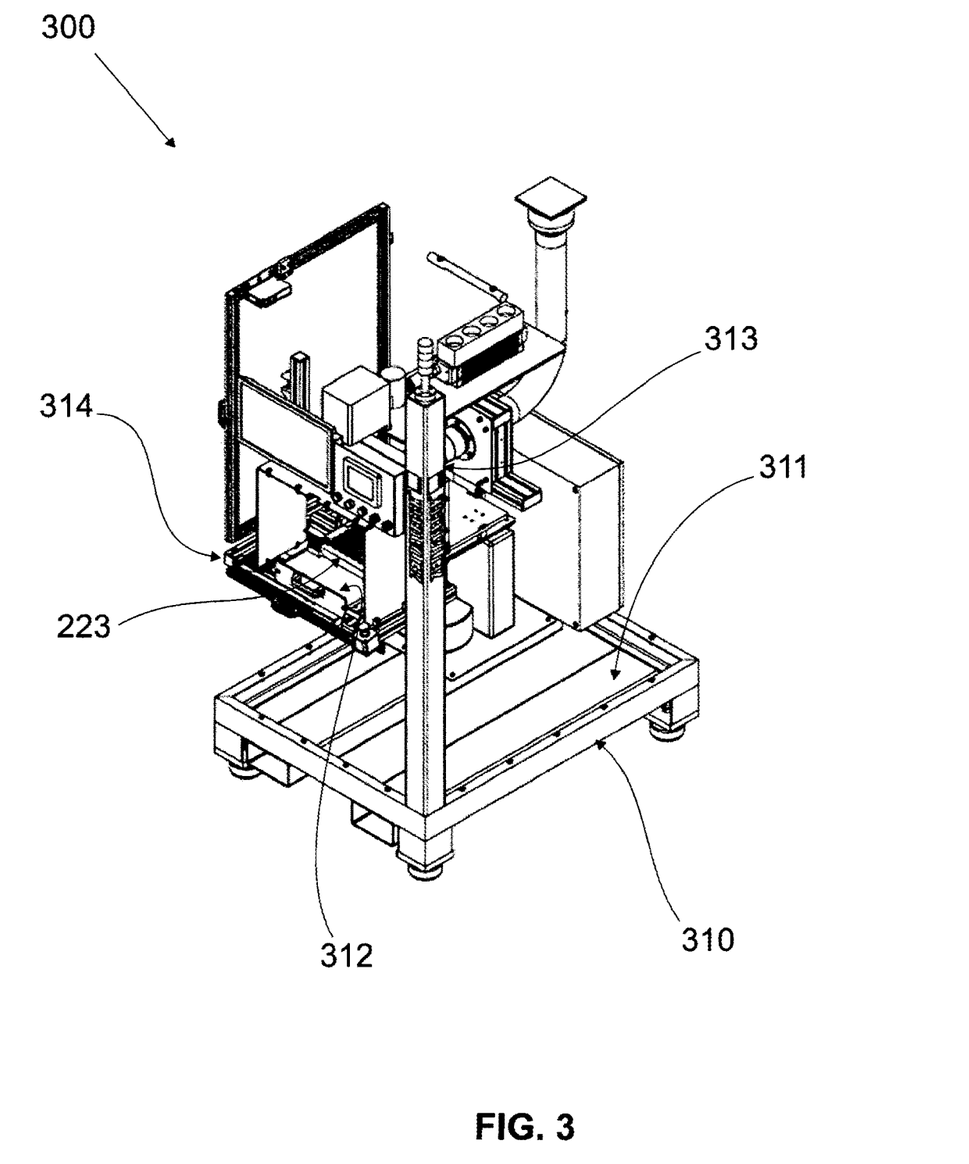
FIG. 3 is a first perspective view of the insert mounting device that constitutes the object of the present invention.
Figure 4:
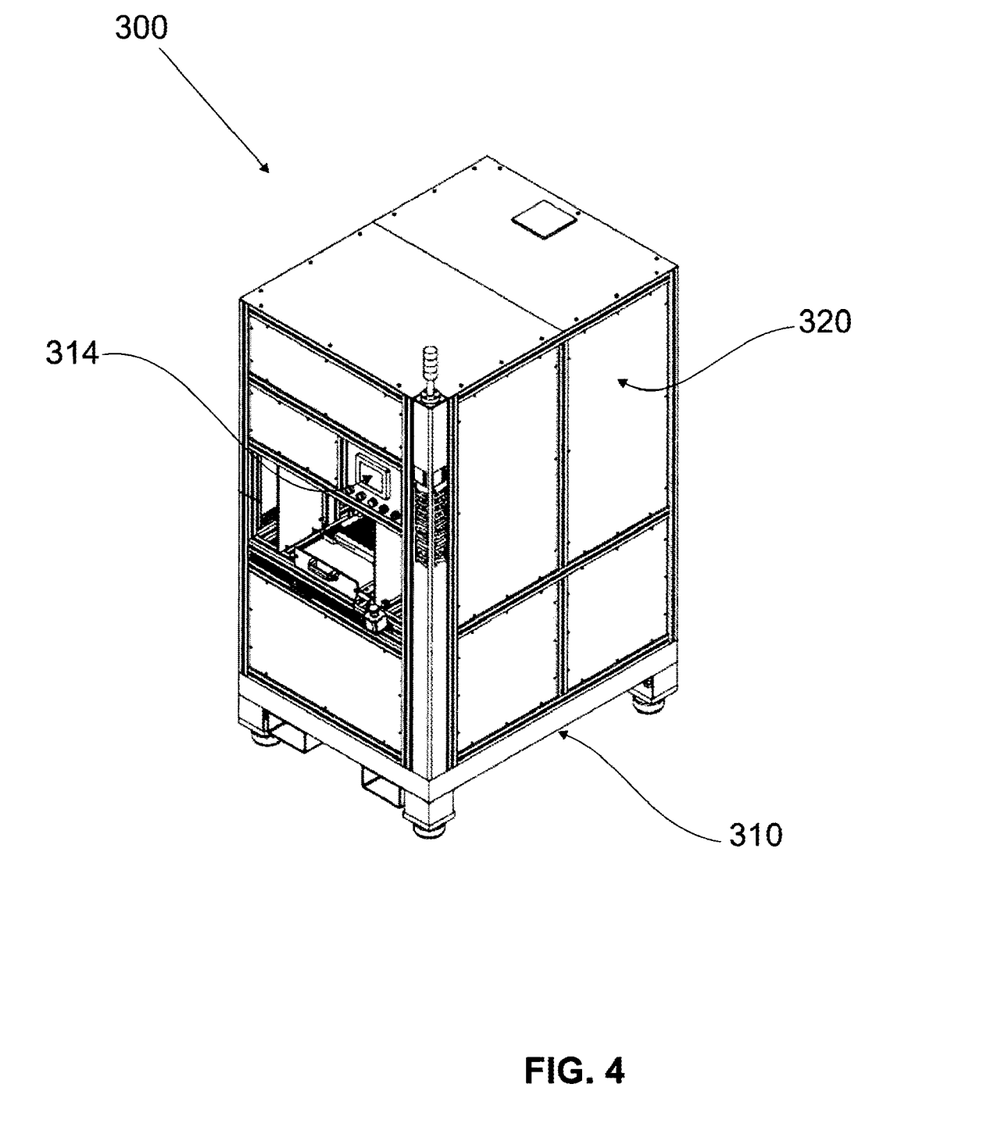
FIG. 4 is a second perspective view of the insert mounting device that constitutes the object of the present invention.

That insert mounting device 300 is formed by a supporting structure 310 covered by a protective lid 320. The supporting structure 310 comprises a holding base 311 that holds a supporting table 314, over which are a rotating insert tray holder, which receives the inserts tray 223 to be prepared and allows the rotation of that insert tray by 180 degrees. That rotation may be provided manually by the operator or automatically by the device 300.

Figure 2:
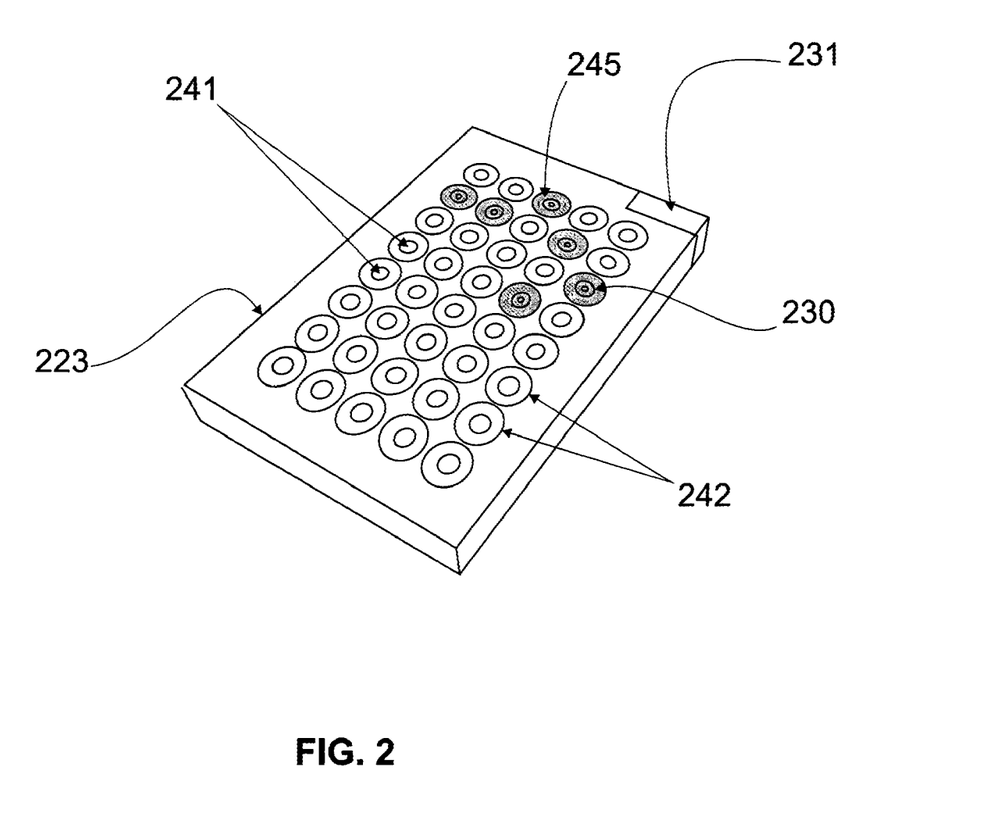
FIG. 2 is a schematic perspective view of the inserts tray.

As may be seen in FIG. 2, the inserts trays 223 are parallelepiped-shaped blocks of standardized size, provided with at least one sensor 231 of RFID type provided at one of its vertexes and provided with a plurality of through-holes 241. Each through-hole 241 comprises a depression 242 of larger diameter made in one of the faces of the inserts tray 223. That depression 242 is concentric with the through-hole 241 that receives the insert 230 while the role of the depression 242 is to serve as a gauge for the cutting-out of an adhesive film that is applied to the inserts 230. The diameter of the through-holes 241 varies from one insert tray to another depending on the different inserts 230 that are used.

The inserts mounting device 300 further comprises a cutting system formed by a $CO_2$ laser set 313. That cutting system 313 cooperates with the insert tray holder 312 and its function is to cut the adhesive film following the diameter of the depression 242, forming a plurality of single films associated to an insert 230.

The covering lid 320 covers the supporting structure 310 protecting the cutting system and other components of the device 300, in addition to protecting the operator, providing access to the insert tray holder 312 for placement and removal of the insert trays 223 and to a panel with numeric controls 314 for setting up the insert preparation parameters 230.

Figure 5:
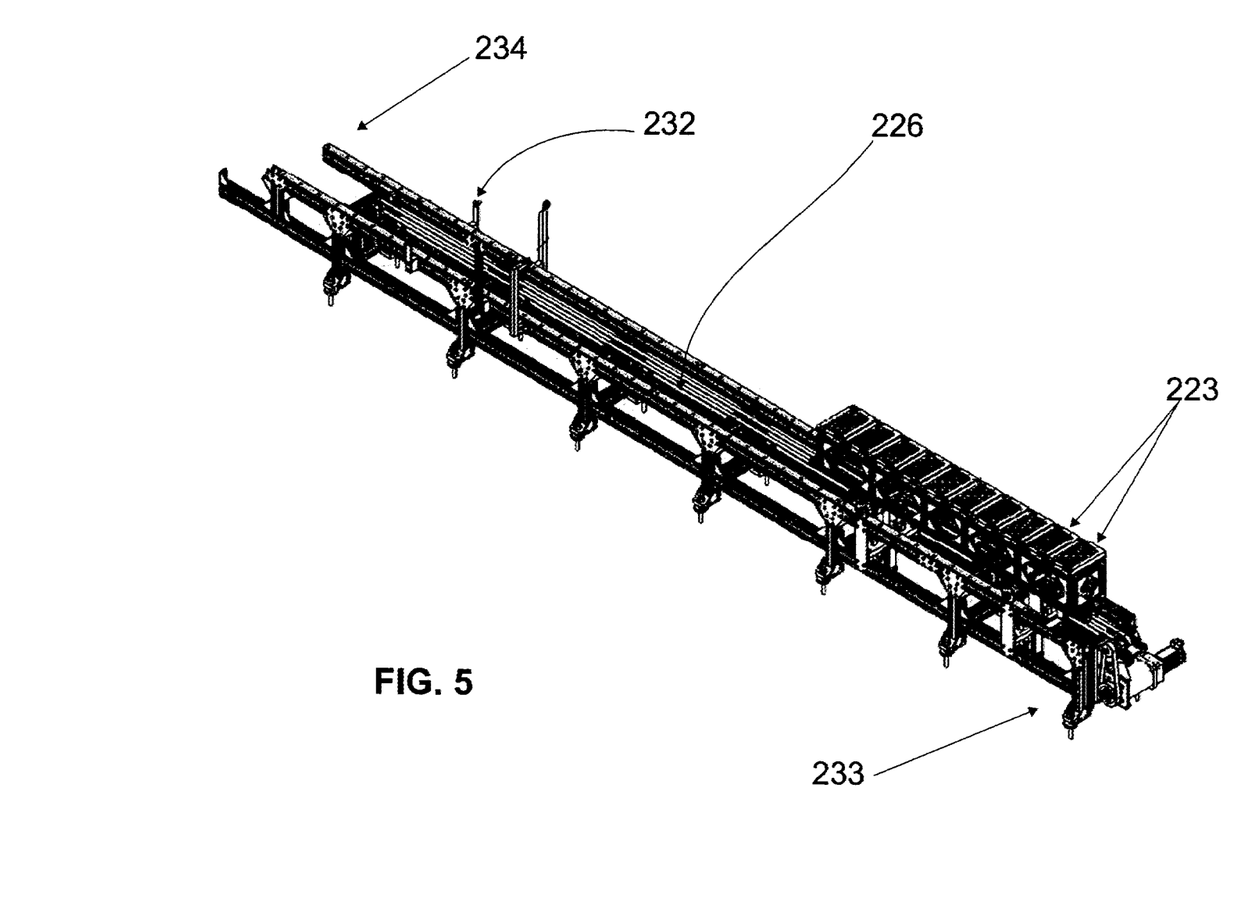
FIG. 5 is a perspective view of the inserts tray guide rail

Associated to the insert mounting device 300 there is a guide rail 226 that comprises a free end 233 and an embedded end 234. In a region near the embedded end 234 there is positioned a reader 232 that identifies the incoming of an inserts tray 223 from the sensor 231 provided on that inserts tray 223. The data received by the reader 232 consist of information on the type and quantity of inserts 230 provided in the tray 223 and are sent to a supervisory system of the integrated manufacture cell (not shown).

The method for mounting inserts mounts the inserts 230 on the inserts mounting device 300, such that these inserts 230 are available to be used by the integrated manufacture cell.

Figure 1:
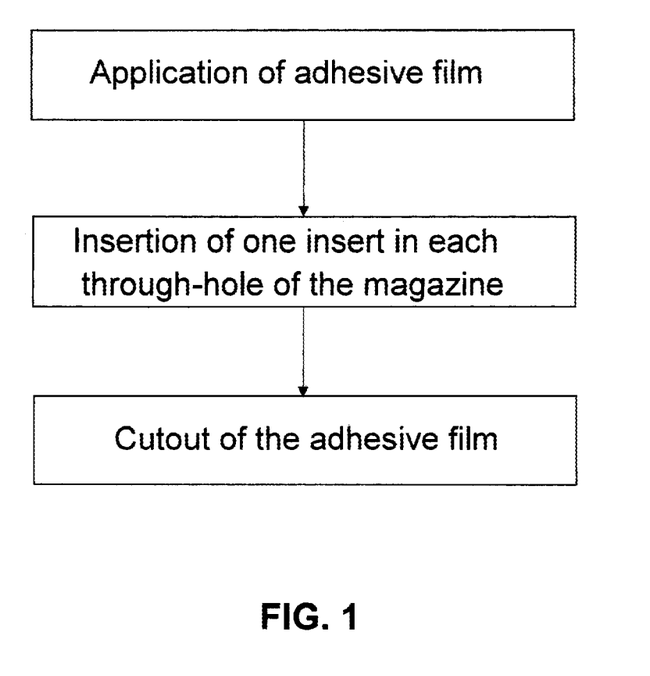
FIG. 1 is a flow diagram of the method for mounting inserts that constitutes the object of the present invention.

That method comprises the steps of: (i) application of an adhesive film over one of the faces of an inserts tray 223 covering a plurality of through-holes 241 and recesses 242; (ii) Insertion of one insert 230 in each through-hole 241 of the tray 223 from a face of the insert tray opposed to that of the adhesive film, securing one surface of the insert 230 on this adhesive film; and (iii) Cutting-out of the adhesive film forming a plurality of single adhesive films 245 associated to the inserts 230.

Prior to the application of the adhesive film, the inserts tray 223 is positioned on the rotary insert tray holder 312, within the inserts mounting device 300. An adhesive film applicator (not shown) is passed over the face of the inserts tray 223 gluing the adhesive film over that face of the tray 223.

After the application of the adhesive film, the inserts tray is rotated by 180 degrees by means of the rotary tray holder 312, causing the face of the inserts tray 223 with the adhesive film to be upside down and the face of the inserts tray 223 without the adhesive film to be turned up, allowing the insertion of an insert 230 in each through-hole 241. Therefore, one of the surfaces of the insert 230 is glued to the adhesive film provided at the bottom of the through-hole 241 and the other surface, provided opposite that which is glued to the adhesive film, remains free.

After the insertions of the inserts 230 in each through-hole 241 and the gluing of one of the surfaces of the insert 230 to the adhesive film provided at the bottom of the through-hole 241, the inserts tray 223 is caused to effect another turn of 180 degrees, such that the face of the inserts tray 223 with the adhesive film is once again turned upside.

With the inserts tray 223 covered with the adhesive film turned upside, there is initiated the cutting-up of the adhesive film. That cutting is performed by a cutting system 313 that consists of a $CO_2$ laser, without damaging the inserts tray 223 or the insert 230.

In that case, the adhesive film is cut according to the diameter of the depression 242 concentric with the diameter of the through-hole 241, forming a plurality of single films 245 or adhesive circles, each containing an insert 230 glued thereto (FIG. 2).

Figure 6:
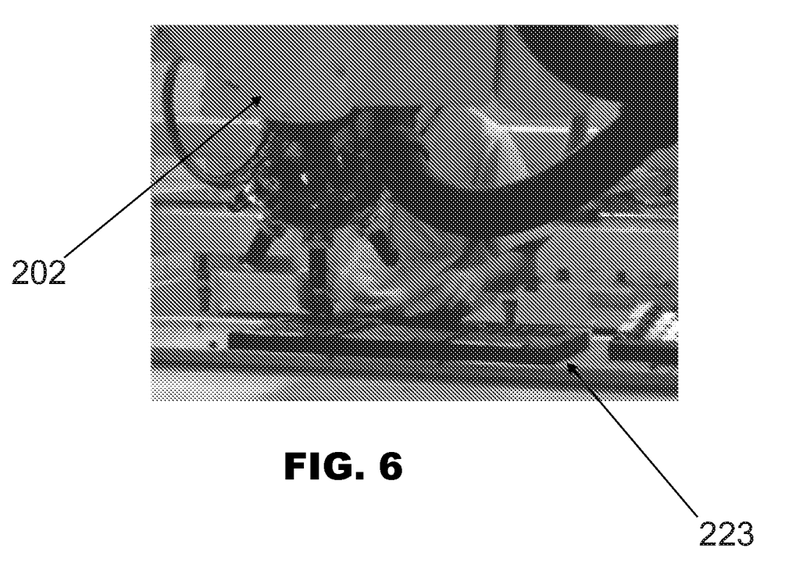
FIG. 6 illustrates a robotic arm collecting inserts from the trays.
Figure 7:
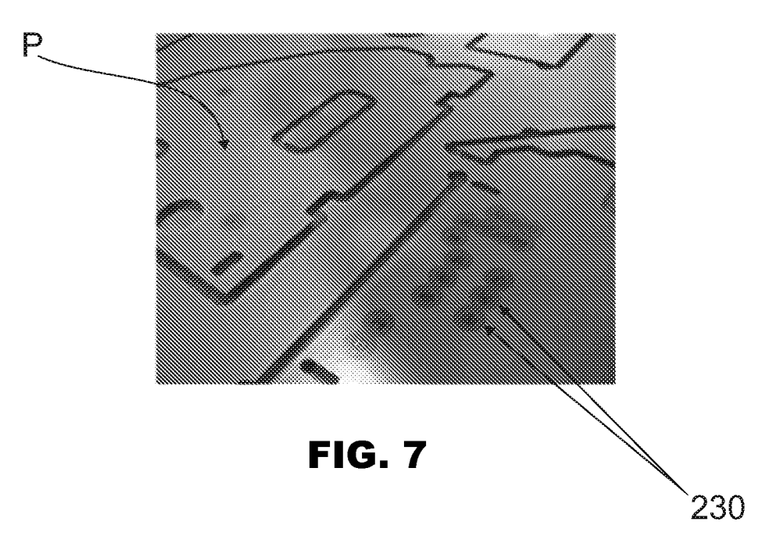
FIG. 7 illustrates the inserts positioned in the adequate holes in the machined plate for the manufacture of furniture pieces.

The inserts 230 are then ready to be used by the integrated manufacturing cell by means of a robotic arm 202 that will insert them in the plates P, as illustrated in FIGS. 6 and 7.

Thus, differently from the prior art, the method of mounting inserts that constitutes the object of this invention comprises procedures that warrant repetition, trustworthiness and productivity. Furthermore, the inserts mounting device allows the automation of the mounting of inserts, reducing labor costs and allowing access to the tray with inserts prepared by machining centers of automated fabrication processes that use such inserts, as, for example, in an automated process of manufacture of furniture pieces.

Upon having described a preferred embodiment of the invention, it should be understood that the scope of the present invention comprehends other possible variations, being limited only by the content of the attached claims, including the possible equivalents thereof.

The invention claimed is:

1. A method of providing inserts to facilitate automated mounting thereof, wherein the method comprises the following steps:

(i) providing an insert tray having a plurality of through-holes between opposed first and second faces of the insert tray to receive an individual insert therein and a corresponding plurality of depressions in the first face of the insert tray, wherein each of the depressions has a larger diameter than and is concentrically formed with a respective one of the through-holes in the insert tray so as to define a cutting boundary;

(ii) positioning the insert tray on a rotatable support table which allows the insert tray to be rotated between first and second orientations to thereby allow one of the first and second faces to respectively assume an operative position while another of the first and second faces is in an inoperative position;

(iii) orienting the insert tray in the first orientation such that the first face is in the operative position and then applying an adhesive film on the first face of the insert tray so as to cover the plurality of through-holes and respective depressions thereof on the first face while the through-holes on the second face remain exposed;

(iv) subsequently reorienting the support table by rotatably moving the support table into the second orientation such that the second face is in the operative position and the first face with the adhesive film thereon is in the inoperative position opposite to the second face and then inserting a plurality of inserts into respective ones of the exposed through-holes of the insert tray in the second face of the insert tray to cause the inserts to contact the adhesive film on the opposed first face thereby adhesively securing one end of each of the inserts onto the adhesive film;

(v) subsequently reorienting the support table by rotatably moving the support table so that the insert tray is once again in the first orientation to thereby place the adhesive film on the first face in the operative position; and thereafter (vi) cutting the adhesive film around the through hole at the cutting boundary defined by the depression to thereby form a plurality of individual single adhesive films having a respective one of the inserts attached thereto.

2. The method according to claim 1, wherein step (iv) comprises rotating the insert tray by 180°.

3. The method according to claim 2, wherein step (v) comprises rotating the support table by 180°.

4. The method according to claim 3, wherein step (vi) comprises laser cutting of the adhesive film by a cutting system that includes a CO2 laser.

5. The method according to claim 1, wherein the first face of the insert tray is positioned above the second face of the insert tray when in the first orientation, and the second face of the insert tray is position above the first face of the insert tray when in the second orientation.

6. The method according to claim 1, wherein step (i) includes providing the insert tray with a sensor.

7. The method according to claim 6, wherein the sensor is a radio-frequency identification (RFID) sensor.

8. The method according to claim 6, wherein the sensor provides data indicative of the type and quantity of the inserts in the insert tray.

9. The method according to claim 6, wherein step (i) includes positioning the sensor at a vertex of the insert tray.

10. A device to provide a plurality of inserts and facilitate automated mounting thereof, the device comprising:
   an insert tray having a plurality of through-holes between opposed first and second faces of the insert tray to receive an individual insert therein and a corresponding plurality of depressions in the first face of the insert tray, wherein each of the depressions has a larger diameter than and is concentrically formed with a respective one of the through-holes in the insert tray;
   a rotatable support table for supporting the insert tray, the support table being supported above the supporting base for rotational movements between first and second orientations to thereby allow one of the first and second faces to respectively assume an operative position while another of the first and second faces is in an inoperative position;
   an adhesive film applicator positioned so as to apply adhesive film on the first face of the insert tray so as to cover the plurality of through-holes and respective depressions thereof on the first face when the insert tray is in the first orientation while the through-holes on the second face remain exposed;
   an insertion system for placing individual ones of the inserts within respective through holes when the insert tray is in the second orientation such that the second face is in the operative position and the first face with the adhesive film thereon is in the inoperative position opposite to the second face; and
   a cutting system which cuts the adhesive film around the through hole at the diameter of the depression to thereby form a plurality of individual single adhesive films having a respective one of the inserts attached thereto.

11. The device according to claim 10, wherein the rotatable support table rotates through 180° between the first and second orientations thereof.

12. The device according to claim 11, wherein the cutting system comprises a cutting laser.

13. The device according to claim 12, wherein the cutting laser is a CO2 laser.

14. The device according to claim 11, wherein the first face of the insert tray is positioned above the second face of the insert tray when in the first orientation, and the second face of the insert tray is position above the first face of the insert tray when in the second orientation.

15. The device according to claim 10, wherein the insert tray comprises a sensor.

16. The device according to claim 15, wherein the sensor is a radio-frequency identification (RFID) sensor.

17. The device according to claim 15, wherein the sensor provides data indicative of the type and quantity of the inserts in the insert tray.

18. The device according to claim 17, further comprising a rail system for receiving the insert tray with the plurality of individual single adhesive films having a respective one of the inserts attached thereto.

19. The device according to claim 18, wherein the rail system comprising a data reader for reading the data from the sensor.

* * * * *